(12) United States Patent
Kim et al.

(10) Patent No.: US 6,940,520 B2
(45) Date of Patent: Sep. 6, 2005

(54) ANISOTROPIC TEXTURE FILTERING METHOD AND APPARATUS USING AREA COVERAGE WEIGHT OF SUB-TEXEL PRECISION

(75) Inventors: Lee Sup Kim, Taejon (KR); Hyun Chul Shin, Pusan (KR)

(73) Assignee: Korea Advanced Institute of Science & Technology, Taejon (KR)

( * ) Notice: Subject to any disclaimer, the term of this patent is extended or adjusted under 35 U.S.C. 154(b) by 0 days.

(21) Appl. No.: 09/873,258

(22) Filed: Jun. 5, 2001

(65) Prior Publication Data

US 2003/0206175 A1 Nov. 6, 2003

(30) Foreign Application Priority Data

May 15, 2001 (KR) ........................................ 2001-26377

(51) Int. Cl.[7] .............................................. G06T 11/00
(52) U.S. Cl. ...................................................... 345/582
(58) Field of Search ........................................ 345/582

(56) References Cited

U.S. PATENT DOCUMENTS

| | | | | |
|---|---|---|---|---|
| 5,651,104 A | * | 7/1997 | Cosman | 345/428 |
| 6,005,582 A | * | 12/1999 | Gabriel et al. | 345/586 |
| 6,097,397 A | * | 8/2000 | Lee | 345/586 |
| 6,204,857 B1 | * | 3/2001 | Piazza et al. | 345/582 |
| 6,292,193 B1 | * | 9/2001 | Perry et al. | 345/582 |
| 6,366,290 B1 | * | 4/2002 | Dye et al. | 345/582 |

OTHER PUBLICATIONS

Izquierdo et al., Texture Smoothing and Object Segmentation Using Feature–Adaptive Weighted Gaussian Filtering, 1998, IEEE, pp. 650–655.*
Schilling, A New Simple and Efficient Antialiasing with Subpixel Masks, 1991, ACM, pp. 133–141.*
Barkans, High Quality Rendering Using the Talisman Architecture, 1997, ACM SIGGRAH, pp. 79–88.*
Huttner et al., Fast Footprint MIPmapping, 1999, ACM, pp. 3543, 139.*

* cited by examiner

*Primary Examiner*—Matthew Luu
*Assistant Examiner*—Motilewa Good-Johnson
(74) *Attorney, Agent, or Firm*—Bacon & Thomas, PLLC

(57) ABSTRACT

An anisotropic texture filtering method using area coverage weight of sub-texel precision includes the steps of executing filtering by applying weights to texels; representing four sides of the footprint by four linear equations for computing area coverage weight; obtaining sub-texel masks from a table by addresses given by values of line equations; and calculating the final area coverage weight with four sub-texel masks obtained in the previous step.

8 Claims, 6 Drawing Sheets

ANISOTROPIC TEXTURE FILTERING METHOD AND APPARATUS USING AREA COVERAGE WEIGHT OF SUB-TEXEL PRECISION

BACKGROUND OF THE INVENTION

1. Field of the Invention

The present invention relates to a method and apparatus of anisotropic texture filtering to obtain high quality image for three-dimensional graphics. More particularly, the invention relates to an anisotropic texture filtering method and apparatus using area coverage weight of sub-texel precision.

For three-dimensional graphics having much application in the industry fields of personal computers and high-performance games, texture mapping is one of the most efficient and typical algorithms representing the visual realism of a generated image.

2. Description of the Related Art

Until these days methods using tri-linear filtering have generally been used. However, as it becomes an apparent trend to adopt high quality visualization, anisotropic texture filtering has made frequent appearances. Anisotropic texture filtering can be divided into two categories depending on the schemes used.

For the first type of scheme, the footprint, which is mapping of a pixel onto a texture area, is approximated by a parallelogram and then texels are sampled along the longer one of the two sides of the parallelogram to obtain texture filtered value. This scheme is applied for cases of large computational cost.

However, this scheme has a disadvantage of not providing acceptable image quality for real-time applications. This has been disclosed in U.S. Pat. No. 6,005,582.

For the second type of scheme, a rectangular region is set up to enclose a footprint and then filtering is performed by applying weights to texels contained in the rectangular region. This scheme renders acceptable quality of images for real-time applications. Here is introduced an area coverage weight, which is defined as the fraction that the relevant texel is covered by the footprint. This is again classified into two methods depending on how the area coverage weight is obtained.

The first method pre-determines the area coverage weights according to the shape of the relevant footprint kept in a tabular form and obtains the area coverage weight by using four vertices of the footprint as table address. However, this has a disadvantage that the table size is too large for hardware implementation.

The second method determines the weight of the relevant texel according to whether the center of the texel is enclosed by that footprint. In this method, the weight is 1 if the center of texel is enclosed by the footprint, and 0 otherwise.

To test if a texel center is enclosed by a footprint, the four sides of the footprint is expressed by four line equations surrounding the footprint in a certain direction, e.g., clockwise, and it is decided to be enclosed if all the values resulted from inputting the coordinates of the texel center to the four equations are positive.

Further, to enhance image quality in this method, a texel is divided into sub-texels and the enclosure test is performed for each sub-texel, and then the number of sub-texels enclosed by the footprint is used as the weight for filtering. This has been disclosed in U.S. Pat. No. 6,097,397.

This method is conceptually similar to super-sampling that is used for antialiasing of three-dimensional graphics and has a disadvantage of a low precision due to approximation made for the area coverage weight for the footprint of concerned texel.

Another disadvantage of the method is its heavy computational burden that is due to the fact that the footprint enclosure test is performed by each sub-texel. Moreover, both of the two aforementioned methods have the disadvantage that the area coverage weight is used just for weighting but Gaussian filter that can be used for enhancing image quality of visualization is not applicable.

SUMMARY OF THE INVENTION

It is an object of the present invention to resolve the aforementioned problems by providing an anisotropic texture filtering method and apparatus rendering high quality image visualization at a low computational and hardware cost, in which area coverage weights of sub-texel precision are employed for filtering and the weights are applied for texels enclosed in a rectangular region enclosing the footprint.

To achieve the aforementioned objects, the technical idea constituting the present invention is provided with an anisotropic texture filtering method using area coverage weight of sub-texel precision comprising:

step of executing filtering by applying weights to texels enclosed in a rectangular region enclosing a footprint that is mapped from a pixel onto the texture area;

step of using a multiplication of the footprint area coverage weight of sub-texel precision and the Gaussian filter value as said weight for the relevant texel;

step of representing four sides of the footprint by four linear equations surrounding the footprint in clockwise sequence for computing said area coverage weight of sub-texel precision;

step of obtaining sub-texel masks from table by addresses given by values of line equations on substituting slope of the lines and coordinates of the texels; and step of calculating the final area coverage weight by logically bit-by-bit multiplying four sub-texel masks obtained in the previous step.

The above and other features and advantages of the present invention will be more clearly understood for those skilled in the art from the following detailed description taken in conjunction with the accompanying drawings, which form parts of this disclosure.

DETAILED DESCRIPTION OF THE EMBODIMENT

Hereinafter, the constitution and operation of the present invention is described trough embodiments in detail by referring to the accompanying drawings.

Figure 1:
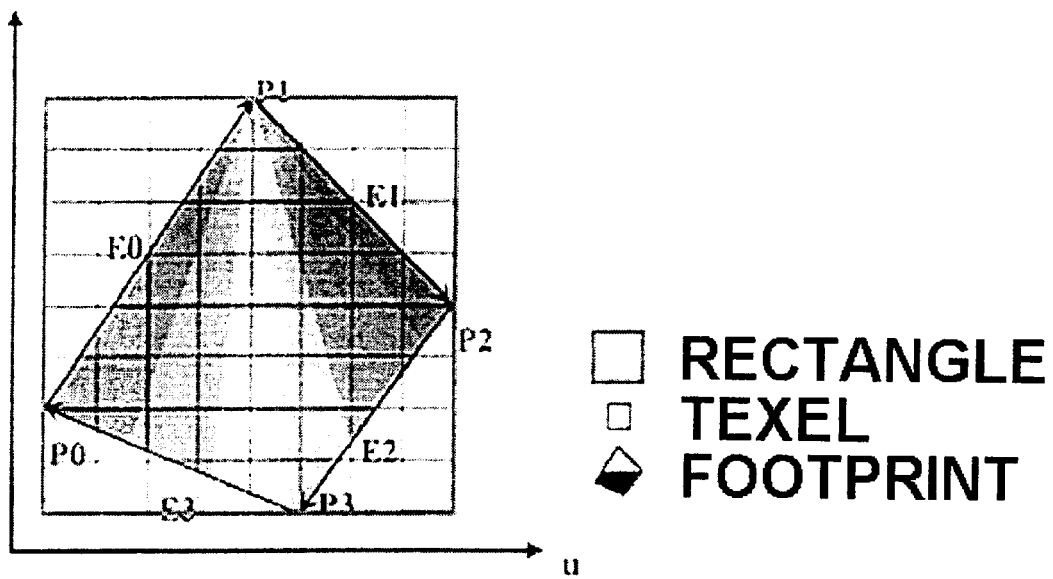
FIG. 1 is a diagram illustrating a footprint that is mapping of a pixel onto the texture area and a rectangular region containing the footprint according to the present invention.
Figure 2:
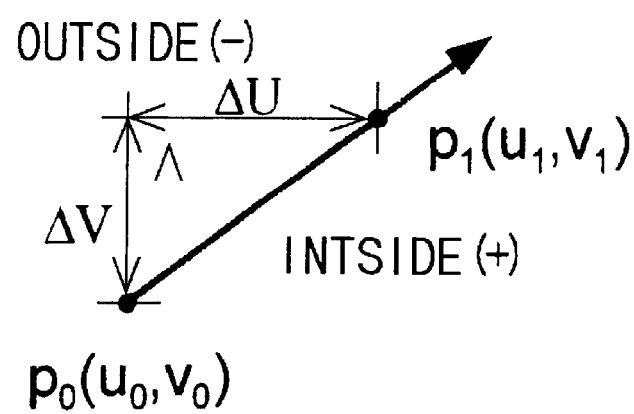
FIG. 2 is a diagram explaining the concept of the line directional from point $P_0$ to point $P_1$ and the associated line equation according to the present invention.

FIG. 1 is a diagram of a footprint that is mapping of a pixel onto the texture area and the rectangular region containing the footprint according to the present invention, and FIG. 2 illustrates the concept of the line directional from point $P_0$ to point $P_1$ and the associated line equation.

As shown in FIG. 1, a footprint has a quadrilateral shape and the four sides of the quadrilateral are represented by four line equations (E0, E1, E2, E3) in clockwise sequence. In FIG. 1, a rectangular region containing the footprint is shown to comprise 64 (8×8) texels. The line directional from point $P_0$ to point $P_1$ shown in FIG. 2 is expressed by equations Eqn. 1 to Eqn. 5 as follows.

$$E(u,v)=(u-u0)*deu+(v-v0)*dev.\qquad \text{[Eqn. 1]}$$

The coefficients used here have the following relationships.

$$deu*\Delta U+dev*\Delta V=0,\qquad \text{[Eqn. 2]}$$

$$deu=(\Delta V)/(|\Delta U|+|\Delta V|),\qquad \text{[Eqn. 3]}$$

$$dev=(-\Delta U)/(|\Delta U|+|\Delta V|),\qquad \text{[Eqn. 4]}$$

$$\Delta U=u1-u0 \text{ and } \Delta V=v1-v0.\qquad \text{[Eqn. 5]}$$

Here, the absolute value resulted from inputting arbitrary point coordinates into the line equation represents the distance between the point and the line, and the sign of the value determines the point location. In other words, the point is inside if the sign is positive while the point is outside if the sign is negative.

Therefore, when a quadrilateral is represented by four line equations in clockwise sequence, if, on inputting the point coordinates, all the values of the line equations are positive, the point is found to be inside the quadrilateral.

Figure 3:
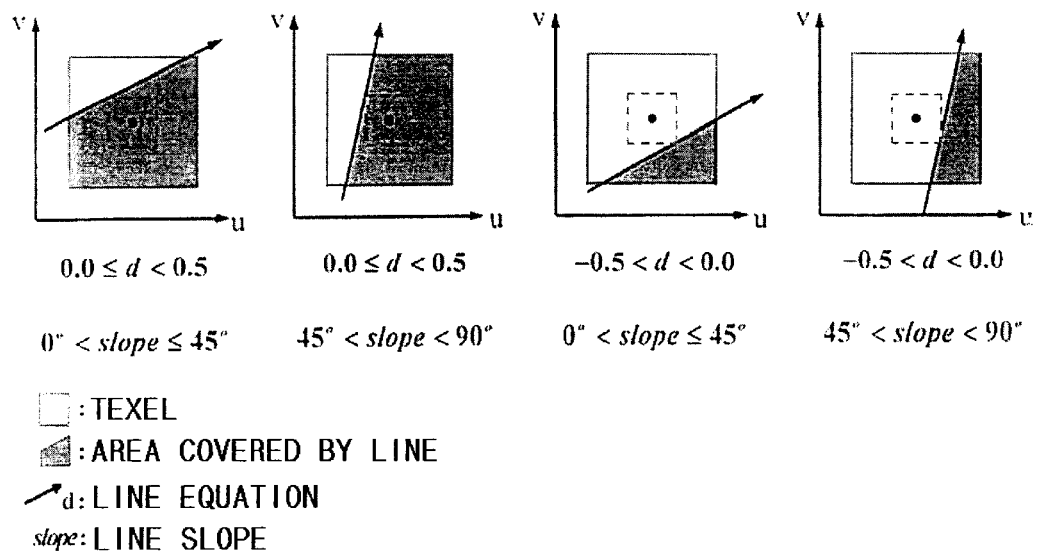
FIG. 3 is a diagram illustrating a coverage area shape and size and the concept of its relation to the associated line equations according to the present invention.

FIG. 3 is a diagram illustrating the relationship of shape and size of the covered area of the texel which part of the plane has positive value being evaluated by the line equation, to the slope of the line and values of the line equations resulted from inputting the texel center coordinates.

As shown in FIG. 3, if the value of line equation is less than −0.5 or greater than +0.5, texel area appears to be either not covered at all or fully covered. The shape and size of the texel area that have been obtained by inputting line slope and texel center coordinates are represented by N×N sub-texel mask form generating a table.

In other words, values of mask are represented by a combination of the values of sub-texels that are either 1 (meaning coverage) or 0 (meaning non-coverage). And, during filtering, the slope and value of line equation are obtained by the table addresses. For calculating the footprint coverage area weight of the texel, first, the sub-texel masks are obtained by using slopes and values of four line equations and then bit-by-bit logical multiplication is performed, and finally it is determined by counting the total number of sub-texel masks of which values are 1.

Figure 4:
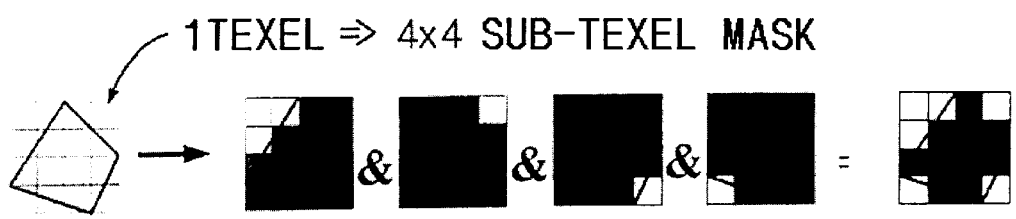
FIG. 4 is a diagram illustrating the process calculating area coverage weight of a texel in relation to four line equations according to the present invention.

FIG. 4 is a diagram illustrating a process calculating the area coverage weight of a texel using 4×4 sub-texel masks for a case where the footprint is contained in a texel.

Here, since the final number of sub-texel masks which have the value of 1 is 10, the area coverage weight becomes $^{10}/_{16}=^{5}/_{8}$. The area coverage weight is sufficiently well represented by 4×4 sub-texel masks.

At this stage, Gaussian filter used for image visualization has the purpose of enhancing image quality and is given by the following equation.

$$\text{WGaussian}=exp(-a*d*d)\qquad \text{[Eqn. 6]}$$

Here, 'a' indicates the filter coefficient and 'd' is the distance from the footprint center to the center of the concerned texel, expressed by values that are normalized to 1.

To prevent speed degradation of Gaussian filter, filter values are obtained from a pre-generated table by distance d as the table address.

Figure 5:
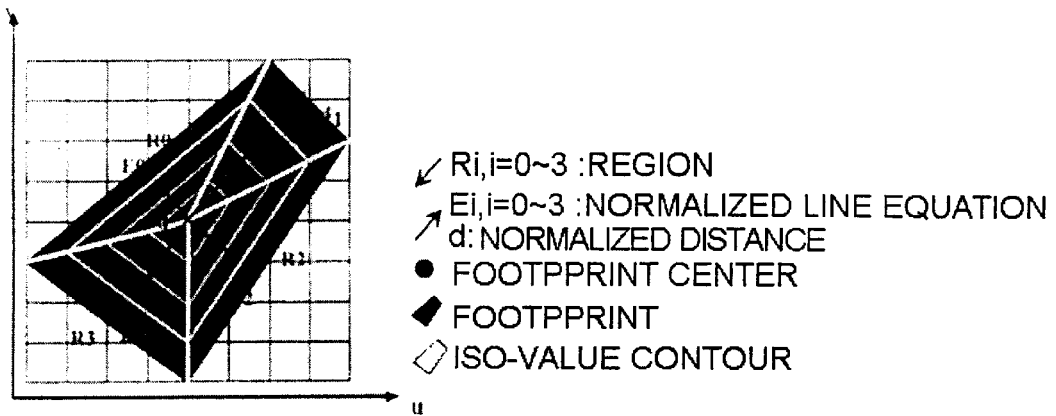
FIG. 5 is a diagram illustrating distance d of Gaussian filter and its relation to line equations according to the present invention.

FIG. 5 illustrates the relation of distance d of Gaussian filter and line equation normalized to 1 which has been used for the area coverage weight calculation, and here the iso-value contour of the filter value is shown to be a quadrilateral.

As shown in FIG. 5, the footprint is divided into four region (R0, R1, R2, R3). The sum of the relevant line equation (R0-E1, R1-E1, R2-E2, R3-E3) normalized for each region and distance d is 1, and, therefore, distance d is obtainable from the relevant line equation.

Since, in each region, the value of the relevant line equation is smaller than that of any other line equation, the smallest value among the four line equation values can be selected actually to determine the distance d in the relevant texel.

For simultaneous execution for all texels within the rectangular region, the values of line equations for each texel must be calculated beforehand. Since line equations are linear, coefficients can be determined by interpolation operation of which can be implemented by adders.

The obtained line equation values are converted to the addresses for the area coverage weight table and the Gaussian filter table, and weights are obtained from each table using these addresses. And then these two weights are multiplied to determine the final weight for every texels.

Figure 6:
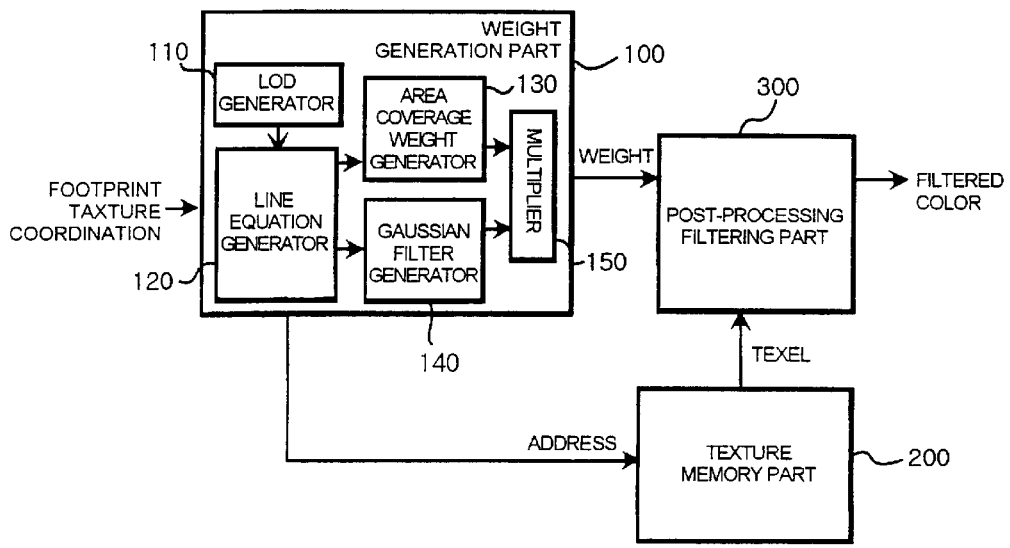
FIG. 6 is a block diagram illustrating the overall constitution of an anisotropic texture filtering apparatus using area coverage weight of sub-texel precision according to the present invention.
Figure 7:
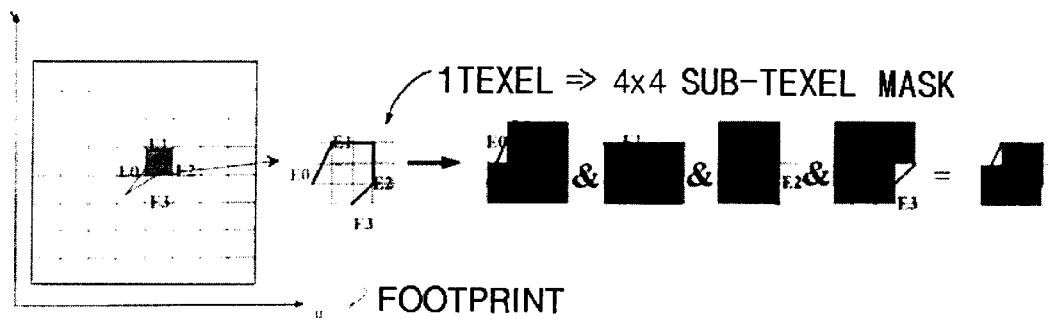
FIGS. 7 through 10 are diagrams explaining the cases using 4, 3, 2, and 1 area coverage weight ROM table, respectively, depending on the embodiments according to the present invention.
Figure 8:
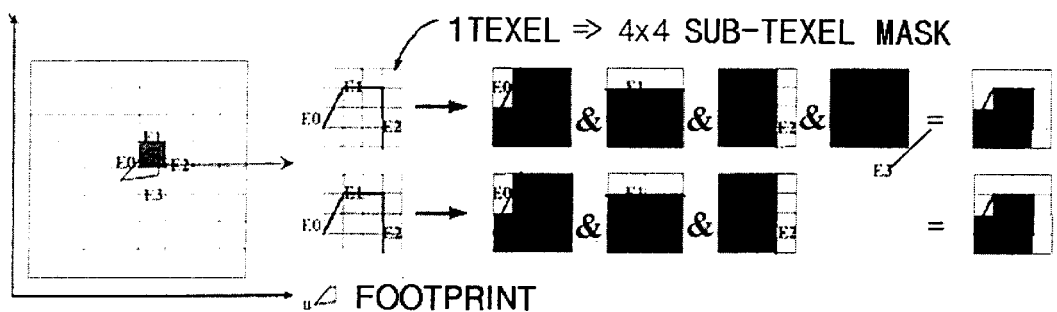
Figure 9:
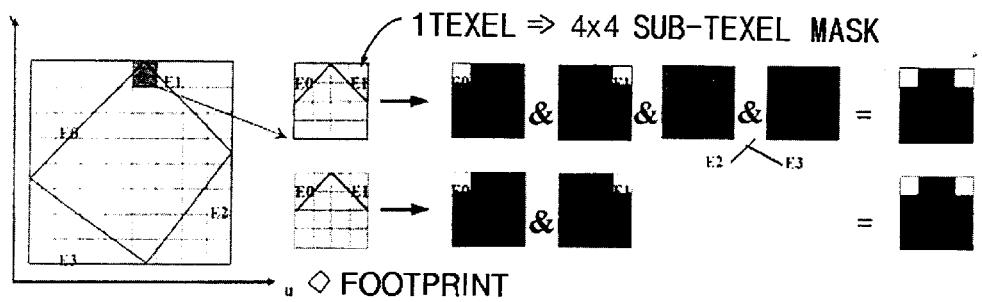
Figure 10:
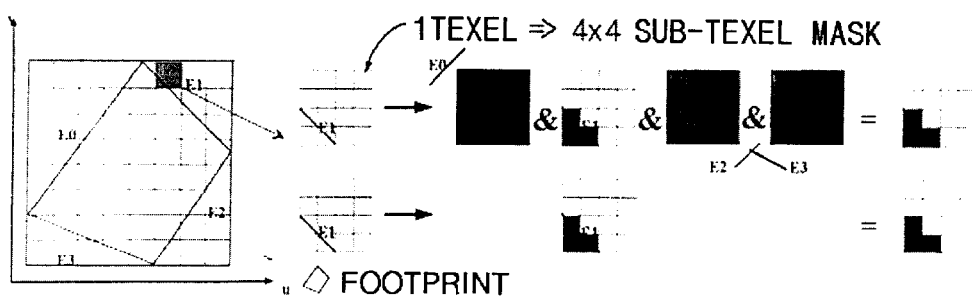

FIG. 6 is a block diagram illustrating the overall constitution of an anistropic texture filtering apparatus using area coverage weight of sub-texel precision according to the present invention.

As shown in FIG. 6, the apparatus comprises; weight generation part (100) which calculates the weight from texture coordinates of footprint vertices; texture memory part (200) which provides texels that are required by the aforementioned weight generation part (100); and post-processing filtering part (300) which performs filtering by applying weights to the texel values obtained from the aforementioned texture memory part (200).

The aforementioned weight generation part (100) further comprises LOD (Level Of Detail) generator (110) which determines mipmap level of texture; line equation generator (120) which calculates value of the line equation and convert it to table address; area coverage weight generator (130) which generates area coverage weight from the table by using information about the four lines as table addresses; Gaussian filter generator (140) which generates filter value from the table by using the information of distance as table address; and multiplier (140) which calculates the final weight by multiplying the values obtained in the aforementioned area coverage weight generator (130) and the Gaussian filter generator (140).

Here, at the stage of converting the calculated line equation value into the table address, division operation required for calculating the coefficients of line equations can be performed by use of ROM and multiplier. For normalization of line equation that is needed to obtain the value of Gaussian filter, computational load can be reduced by employing a scheme where coefficients of line equations are normalizing beforehand and then interpolation method is applied.

Therefore, interpolation method is applied separately for unnormalized line equations used to obtain area coverage weights and for normalized line equations used to obtain Gaussian filter values.

While, since four line equations are associated for each texel, there are basically needed four tables for each texel, but it is not always found to be the case due to the interrelationship between line equation and texel.

FIGS. 7 through 10 illustrate the cases where required numbers of tables are 4, 3, 2, and 1, respectively, according to the embodiments of the present invention.

Since, if the value of line equation is larger than +0.5 for the relevant texel, all sub-texel masks obtained by that line equation have the value of 1, it is figured out that bit-by-bit logical multiplication operation can be performed without the sub-texel masks as shown in each figure. Since the cases that use 4 or 3 tables are very rare, these cases are merged together to the case using four tables.

Therefore, area coverage weight generation part is implemented not only with blocks logically multiplying four ROM data, but with hardware responsible for three cases with 4, 2 and only 1 ROM data and making use of the appropriate ROM block depending on the cases, thus the overall ROM size is further reduced.

Especially, since, if only one ROM is needed, logical multiplication is not required, the number of sub-texel masks that have the value of 1 can be used for ROM data instead of using the sub-texel masks, thus number of bits of ROM data can be reduced.

Figure 12:
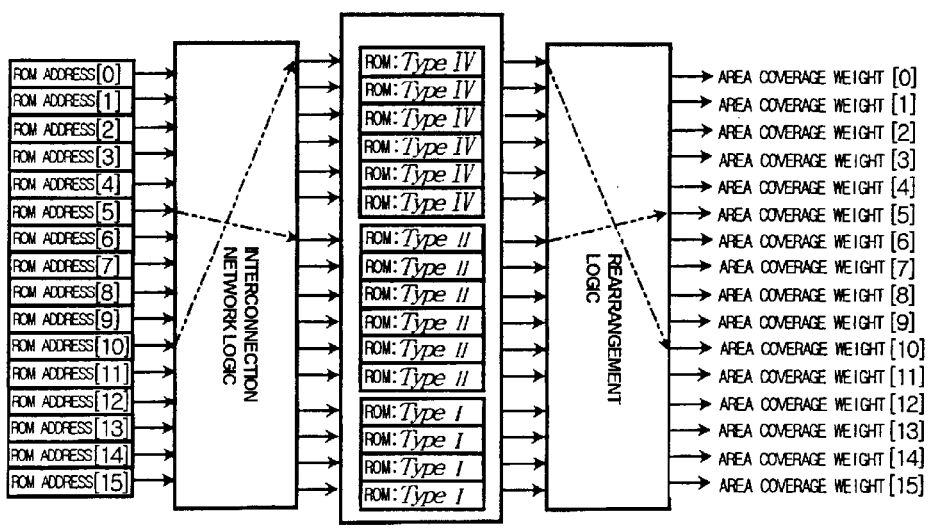
FIG. 12 is a diagram illustrating a process of utilizing ROM table blocks for relevant cases when calculating the area coverage weight shown in FIG. 11.

Type IV block consisting of 4 ROMs shown in FIG. 12 can perform the role of the block with two or one ROM, and similarly, Type II block consisting of two ROMs can replace the role of Type I block having one ROM. Depending on the cases, interconnection network logic is required at the input terminal of the ROM core to connect relevant ROM blocks.

Since ROM addresses [0–15] are connected to the ROM core through the interconnection network logic, it is required to rearrange the area coverage weights and there is provided with are arrangement logic at the output terminal for this purpose.

Figure 11:
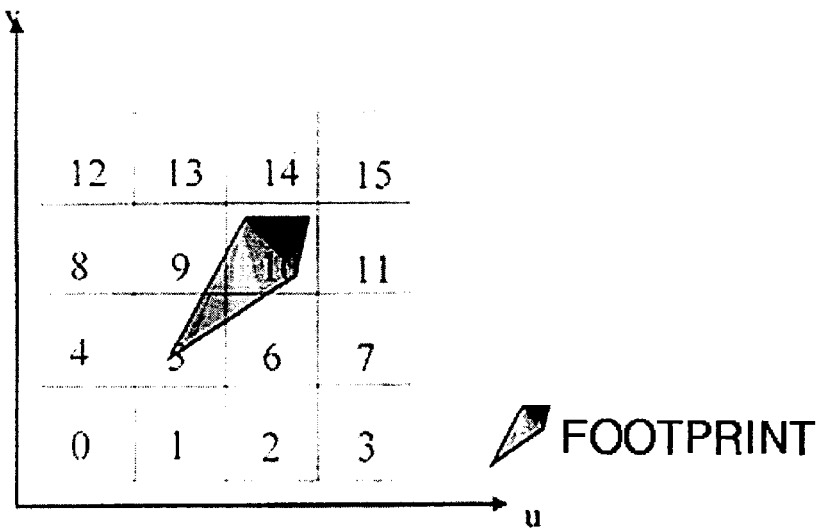
FIG. 11 is a diagram illustrating a footprint contained in a rectangular region comprising 16 texels according to the present invention.

A footprint mapped into a rectangular region comprising 16 texels as shown in FIG. 11 illustrates this. And FIG. 12 illustrates the process for obtaining the area coverage weights for 16 texels by focusing on the examples of area coverage weights [5] and [10] out of 16 area coverage weights [0–15].

Numerals marked on the texels of FIG. 11 indicate indices that correspond to numerals in brackets of FIG. 12. For the case of texel 10, which requires 4 ROMs, the area coverage weight is obtained by connecting ROM address to Type IV block through the interconnection network logic. The obtained area coverage weight at this block needs to be rearranged to number 10 position, which is dealt by the rearrangement logic.

As shown above, the anisotropic texture filtering method and apparatus using area coverage weight of sub-texel precision according to the present invention allows the following advantages.

First, since filtering is performed using the texel weight given by multiplying the area coverage weight and the Gaussian filter value that are accurately determined according to the present invention, high quality image visualization is available.

Second, since the area coverage weight calculation is performed not by sub-texel but by texel according to the present invention, computation load is reduced.

Third, when weights are calculated for many texels simultaneously by obtaining each area coverage weight from the relation of line equation and texel according to the present invention, the implementation is grouped for three cases with four, two and one table and made use of the relevant table blocks depending on the cases, and thus the overall table size and hardware implementation cost are reduced.

Although the present invention has been described and illustrated in connection with the specific embodiments, it will be apparent for those skilled in the art that various modifications and changes may be made without departing from the idea and scope of the present invention set forth in the appended claims.

What is claimed is:

1. An anisotropic texture filtering method for three-dimensional processing, by a computer, of an image to be displayed on a computer graphics display, the method using area coverage weight of sub-texel precision, comprising the steps of:

mapping a footprint of a pixel of the image onto a texture area;

executing filtering of the image by applying weights to texels enclosed in a rectangular region enclosing the footprint that is mapped from the pixel onto the texture area;

using a multiplication of the footprint area coverage weights of sub-texel precision and the Gaussian filter value as said weight for the relevant texel;

representing four sides of the footprint by four linear equations surrounding the footprint in clockwise sequence for computing said area coverage weight of sub-texel precision;

obtaining sub-texel masks from table by addresses given by values of line equations on substituting slope of the lines and coordinates of the texels; and calculating the final area coverage weight by logically bit-by-bit multiplying four sub-texel masks obtained in the previous step.

2. An anisotropic texture filtering method using area coverage weight of sub-texel precision of claim 1 wherein said Gaussian filter value is obtained from a pre-generated table of values by using the distance from footprint center to texel as the address.

3. An anisotropic texture filtering method using area coverage weight of sub-texel precision of claim 2 wherein said distance is calculated from the line equation by using the relation that the sum of the distance and the value of a line equation normalized to 1 is 1.

4. An anisotropic texture filtering method using area coverage weight of sub-texel precision of claim 1 wherein when calculating the area coverage weight from the relation of said line equation and texel, the required table blocks are prepared for three cases and usage is made for the relevant one among these table blocks depending on the cases.

5. An anisotropic texture filtering apparatus using area coverage weight of sub-texel precision comprising:

weight generation means which calculates the weight from texture coordinates of footprint vertices;

texture memory means which provides texels that are required by said weight generation means; and post-processing filtering means which performs filtering by applying weights to the texel values obtained from said texture memory means.

6. An anisotropic texture filtering apparatus using area coverage weight of sub-texel precision of claim 5 wherein said weight generation means further comprises an LOD generator which determines mipmap level of texture;

a line equation generator which calculates the value of a line equation and converts it to a table address;

an area coverage weight generator which generates area coverage weight from the table by using information about the four lines as the table addresses;

a Gaussian filter generator which generates a filter value from the table by using the information of distance as table address; and a multiplier which calculates the final weight by multiplying the values obtained in said area coverage weight generator and said Gaussian filter generator.

7. An anisotropic texture filtering apparatus using area coverage weight of sub-texel precision of claim 6 wherein division operations required for calculating the coefficients of line equations in said line equation generator are performed by use of ROM and multiplier.

8. An anisotropic texture filtering apparatus using area coverage weight of sub-texel precision of claim 6 wherein for line equation normalization that is needed to obtain the value of the Gaussian filter, coefficients of the line equations are normalized beforehand and then interpolation is performed.

* * * * *